United States Patent [19]
Weiler et al.

[11] 4,325,407
[45] Apr. 20, 1982

[54] PRESSURE CONTROL UNIT

[75] Inventors: Rolf Weiler, Ffm.-Sindlingen; Bernd Schopper, Frankfurt am Main, both of Fed. Rep. of Germany

[73] Assignee: ITT Industries, Inc., New York, N.Y.

[21] Appl. No.: 169,695

[22] Filed: Jul. 17, 1980

[30] Foreign Application Priority Data

Jul. 27, 1979 [DE] Fed. Rep. of Germany ....... 2930476

[51] Int. Cl.$^3$ ............................................... B60T 8/26
[52] U.S. Cl. .................... 137/493.2; 303/6 C
[58] Field of Search .................. 137/493, 493.1, 493.2, 137/493.6; 303/6 C, 22 R; 188/349

[56] References Cited

U.S. PATENT DOCUMENTS

| | | | |
|---|---|---|---|
| 3,283,504 | 11/1966 | Stelzer | 303/6 C X |
| 3,360,004 | 12/1967 | Lewis et al. | 137/493 |
| 3,623,776 | 11/1971 | Wellman | 137/493.2 X |
| 4,113,317 | 9/1978 | Farr | 303/6 C |

FOREIGN PATENT DOCUMENTS 46-39964 of 1971 Japan .................. 303/6 C
1183523 3/1970 United Kingdom ............... 303/6 C

*Primary Examiner*—Robert G. Nilson
*Attorney, Agent, or Firm*—John T. O'Halloran; Alfred C. Hill

[57] ABSTRACT

Pressure control devices with a valve connected between an inlet chamber and an outlet chamber and a non-return valve operating as a by-pass are known. The non-return valve opens due to a reduction in pressure in the inlet chamber relative to the pressure in the outlet chamber against a closing force. This type of known pressure control devices are very expensive to manufacture and are not safe against failure and great erosion. According to the present invention a single arrangement providing the valve and the non-return valve comprises a tappet with a valve body fixed thereto to provide the operation of both valves. The valve body is essentially cylindrical and elastic and its outer surface is spaced from the inner surface of the outlet chamber. The outer surface of the valve body is armored in such a way that a deformation in the radial direction toward the inner surface of the outlet chamber is avoided.

17 Claims, 1 Drawing Figure

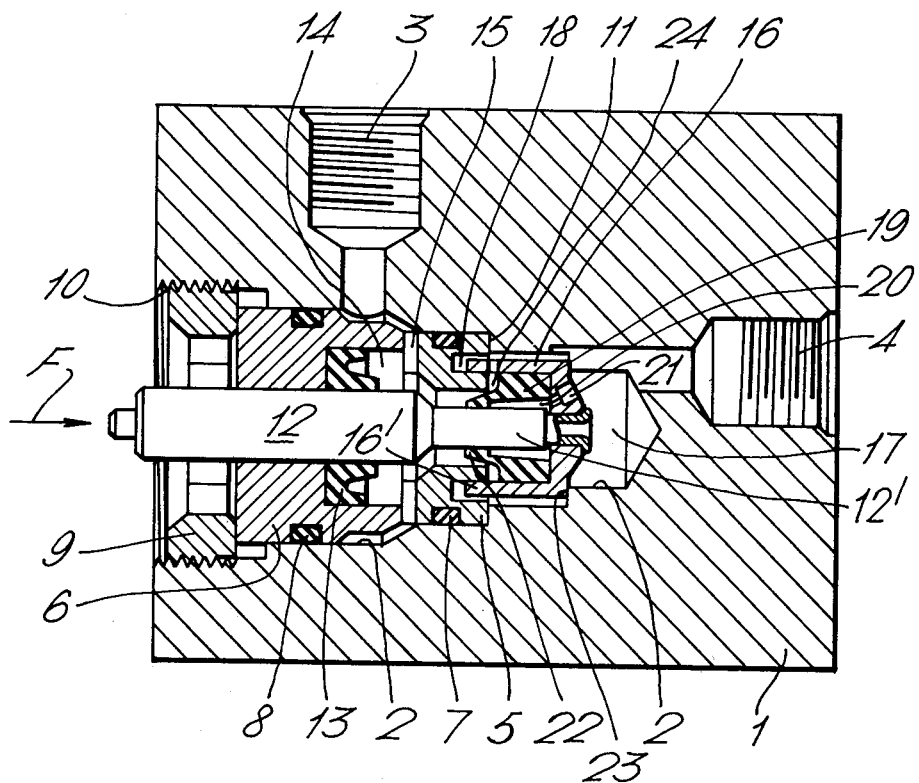

PRESSURE CONTROL UNIT

BACKGROUND OF THE INVENTION

The present invention relates to a pressure control unit with an inlet chamber which may be connected to a master cylinder, an outlet chamber which may be connected to a slave cylinder, a valve interconnected between the two chambers and closing upon a predetermined switching pressure, and a check valve connected in parallel therewith as far as operation is concerned, a pressure reduction in the inlet chamber relative to the outlet chamber causing the check valve to open against a closing force.

Such a pressure control unit is described in the U.S. Pat. No. 3,088,285. In the known device the annular seal has two parallel end faces, a cylindrical inside circumferential surface, and a slightly arched outside circumferential surface. The outside circumferential surface serves to override the end of the by-pass channel designed as bore, annular gap, or the like. The size of the inside circumferential surface slightly exceeds that of the portion of the piston associated with the annular seal. The annular seal is held between two flanges of the piston, the distance between them slightly exceeding the height of the annular seal. The flange adjacent to the inlet chamber has a bore leading to the inside diameter. During normal operation, i.e. with the inlet pressure predominating, the annular seal will be pressed in a sealed relation against the flange adjacent to the outlet chamber. Thus, any communication between the inlet and outlet chambers is only possible via the by-pass channel. However, if the outlet pressure is predominating, the annular seal will be displaced axially. Thus, a return channel is formed which will extend along the one end face and the inside circumferential surface of the annular seal. Very close manufacturing tolerances have to be observed in this design since even slight inaccuracies will be sufficient to keep the return channel permanently closed, or to have the outlet surface abut the circumference of the cylinder chamber with excessive force. A reliable mode of operation of the known pressure control unit is likewise not safeguarded due to the fact that the elastic annular seal is deformed by the excessive stress forces, and, thus, tolerances ensuing in the closing distance. Moreover, wear has a limiting effect on its life. The annular seal does not only perform a relative movement with respect to the housing, but also a relative movement with respect to the piston. The thus ensuing manifestations of wear will in course of time lead to changes in the dimensions which will cause an unreliable sealing action.

SUMMARY OF THE INVENTION

It is an object of the present invention to provide a pressure control unit of the type referred to above which will work reliably, which has a simple structure, and which will be free from wear, or from marked deformation of the valve.

A feature of the present invention is the provision of a pressure control unit comprising: a housing having a bore therein coaxial of a longitudinal axis; an inlet chamber disposed in the bore; an outlet chamber spaced from the inlet chamber disposed in the bore; and a valve disposed in the bore between the inlet chamber and the outlet chamber closing a connection therebetween when a predetermined switch pressure is achieved and providing a check valve therebetween which opens against a control force upon a pressure reduction in the inlet chamber relative to pressure in the outlet chamber; the valve including a tappet disposed coaxial of the axis, a substantially cylindrical elastic valve body disposed coaxial of the axis, in an operative association with and surrounding the tappet, the outer surface of the valve body being spaced from the inner surface of the bore, and means surrounding the valve body to reinforce the outer surface thereof to prevent deformation of the valve body toward the inner surface of the bore.

The primary advantages of the inventive pressure control unit are that (a) the elastic valve body is exposed to only a small mechanical application of force, thus, no marked deformations of the valve body results; (b) the elastic valve body does not override any openings, or edges in the housing and as a result it will be free from wear; and (c) the pressure control valve includes a small number of individual components which can be manufactured at low cost.

Another feature of the present invention is that a cylinder constructed as part of a cup-shaped cap is provided for reinforcement of the valve body.

A further feature of the present invention is that the open end of the cap provides a stop means to limit the closing movement of the valve body to keep the forces acting on the valve body small.

Still another feature of the present invention is that the cup engages an axial annular groove in a sleeve fastened in the house to guide the movable part of the valve at two axially different spots. This has the advantage that any tilting will be excluded and that a good sealing action of the valve will be achieved at all times.

Still a further feature is the provision of means which will ensure a sufficient passage of pressure medium if the valve is open.

With regard to the determination of the closing distance, it is of advantage to provide a stop in the outlet chamber of the housing, against which stop the cap is resting. A particularly suitable embodiment of the check valve includes at least one pressure medium channel between the valve body and the valve tappet, the pressure medium channel communicating with the outlet chamber by means of a pressure medium opening disposed in the bottom part of the cup-shaped cap and being sealable against the inlet chamber by means of a sealing lip. The sealing lip is an extension of the elastic valve body, the extension facing the inlet chamber and surrounding the valve tappet in an annular manner. In this way, a check valve is formed which will not require any additional parts and assembly operations.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a pressure control unit in accordance with the principles of the present invention.

DESCRIPTION OF THE PREFERRED EMBODIMENT

Referring to the FIGURE, the pressure control unit of the present invention includes a housing 1 having a stepped bore 2 therein coaxial of a longitudinal axis of housing 1 communicating with a master cylinder via a pressure medium connection 3 and communicating with a slave cylinder for instance, a wheel brake cylinder, via a pressure medium connection 4. A first sleeve 5 and a second sleeve 6 are inserted into bore 2 and seals 7 and 8 seal them to housing 1. A ring 9 screwed into a thread 10 at the open end of bore 2 keeps second sleeve 6 in abutment with first sleeve 5 and the latter, on its part, in abutment with a first stop 11 of housing 1.

In second sleeve 6, a valve tappet 12 is displaceably arranged and sealed to sleeve 6 by a gasket 13. Gasket 13 defines a pressure medium inlet chamber 14 communicating with pressure medium connection 3 through radial openings 15 in first sleeve 5. On a tapered end 12' of valve tappet 12, a cup 16 is fastened which essentially has a cup-shaped construction, the bottom of cup-shaped cap 16 defining a pressure medium outlet chamber 17. The open or free end 16' of cup-shaped cap 16 engages an annular groove 18 of first sleeve 5. Free end 16' of cap 16 is guided with play in radial groove 18, thus, a sufficient passage of pressure medium is safeguarded.

In cup-shaped cap 16, an elastic valve body 19 of essentially cylindrical shape is arranged. Valve body 19 rests at the bottom of cap 16 and at the inner wall of cap 16, keeping a radial distance with respect to valve tappet portion 12'. Thus, a channel 20 is formed which communicates with outlet chamber 17 through an opening 21 in the bottom of cup-shaped cap 16 and which, on the side facing inlet chamber 14, is closed by means of a sealing lip 22 abutting the outer surface of valve tappet portion 12'. The axial distance between valve body 19 and sleeve 5 is coordinated with the axial distance between open end 16' of cap 16 and the bottom of annular groove 18 so as to ensure that when valve body 19 abuts the adjacent end surface of first sleeve 5, no further movement of valve body 19 will take place in the closing direction in order to prevent deformation of valve body 19. A force F such as provided by a constant preset mechanical pressure afforded by a compressed spring, a variable load responsive device included in a motor vehicle and a variable deceleration responsive device included in a motor vehicle, acts on valve tappet 12, thereby biasing cup-shaped cap 16 against a second stop 23 in housing 1 and keeping the valve in its open position.

The mode of operation of the pressure control unit above described will now be set forth.

In the rest position of the control unit, all parts will adopt the positions illustrated in the Figure. If a pressure is built up in inlet chamber 14, the valve being open, in outlet chamber 17 there will also build up a pressure which will correspond exactly to the value of the inlet pressure. When pressure in inlet chamber 14 and in outlet chamber 17 reaches the level of the switching pressure predetermined by force F, the valve will close due to the abutting of valve body 19 against the adjacent end surface of first sleeve 5. Provided the outer diameter of the valve seat formed by first sleeve 5 equals the sealed diameter of valve tappet 12 in gasket 13, a further pressure increase in inlet chamber 14 will not lead to any change in pressure in outlet chamber 17. In this case, the pressure control valve will work as a limiting valve.

If now the pressure in inlet chamber 14 is reduced to a level below the switching pressure, the now existing pressure difference between outlet chamber 17 and inlet chamber 14 will cause sealing lip 22 to lift off tappet portion 12', thus permitting a pressure compensation through channel 20. Consequently, the pressure in outlet chamber 17 will fall below the switching pressure, whereupon the valve will reopen due to the force F.

Provided the outer diameter of the valve seat formed by first sleeve 5 exceeds the diameter of the valve tappet 12 in gasket 13, the described valve will work as a pressure reducer. In such an arrangement, the valve will be closed upon reaching the switching pressure. Upon a further pressure increase in inlet chamber 14 the valve will be reopened by the increased force, the pressure in the outlet chamber 17 increasing whereby a new force increase in the closing direction will be brought about which will cause the valve to close again. This action will effect a pressure increase in outlet chamber 17, the pressure increase being reduced with respect to the inlet pressure in correspondence with the ratio of the effective pressurized surfaces.

Upon a reduction of the pressure in inlet chamber 14 below the value of the pressure prevailing in outlet chamber 17, sealing lip 22 will lift off tappet portion 12' and will bring about a pressure reduction as described above.

The inventive pressure control unit is suitable for many types of pressure control valves, in particular for motor vehicle brake systems. The simple structure and the space-saving construction will render the described pressure control unit also suitable for twin arrangements, or for arrangements in a horizontally opposed manner.

If the radial play between free end 16' of cap 16 and the wall of annular groove 18 is so small that a sufficient passage of pressure medium will not be safeguarded, radial pressure medium openings 24 may be provided in the area between free end 16' and valve body 19.

While we have described above the principles of our invention in connection with specific apparatus it is to be clearly understood that this description is made only by way of example and not as a limitation of the scope of our invention as set forth in the objects thereof and in the accompanying claims.

We claim:

1. A pressure control unit comprising:
   a housing having a bore therein coaxial of a longitudinal axis;
   an inlet chamber disposed in said bore;
   an outlet chamber spaced from said inlet chamber disposed in said bore; and
   a valve arrangement disposed in said bore between said inlet chamber and said outlet chamber including a valve to close a first connection between said inlet chamber and said outlet chamber when a predetermined switching pressure determined by a control force applied to said valve is achieved and a check valve to open a second connection between said inlet chamber and said outlet chamber upon a pressure reduction in said inlet chamber relative to pressure in said outlet chamber;
   said valve including
      a tappet disposed coaxial of said axis biased by said control force toward said outlet chamber to establish said switching pressure,
      a substantially cylindrical elastic body disposed coaxial of said axis in an operative association with and surrounding said tappet, the outer surface of said valve body being spaced from the inner surface of said bore, the outer surface of said tappet and the inner surface of said valve body cooperating to provide at least a portion of said second connection, and means surrounding said valve body to reinforce the outer surface thereof to prevent deformation of said valve body toward the inner surface of said bore, said means being a cylinder enclosing said valve body, said cylinder being part of a cup-shaped cap having an open end directed toward said inlet chamber and a bottom in said operative association with said tappet, the end of said open end of said cap being a stop to limit the closing movement of said valve body, said open end of said cap engaging an annular groove of a sleeve fixed in said bore adjacent said inlet chamber coaxial of said axis, said groove being parallel to said axis.

2. A unit according to claim 1, wherein
said open end of said cap engages said groove with radial clearance between the walls of said groove and said open end of said cap.

3. A unit according to claim 2, wherein
said first connection includes radial pressure medium openings provided in the wall of said open end of said cap between said sleeve and said valve body.

4. A unit according to claim 3, wherein
a stop is provided in said bore adjacent said outlet chamber against which said bottom of said cap is biased when said valve is open.

5. A unit according to claim 4, wherein
said second connection includes at least one pressure medium channel provided between said valve body and said tappet, said channel communicating with said outlet chamber via a pressure medium opening disposed in said bottom of said cap and being sealable relative to said inlet chamber by a sealing lip.

6. A unit according to claim 5, wherein
said sealing lip is an extension of said valve body extending toward said inlet chamber and surrounding said tappet.

7. A pressure control unit comprising:
a housing having a bore therein coaxial of a longitudinal axis;
an inlet chamber disposed in said bore;
an outlet chamber spaced from said inlet chamber disposed in said bore; and
a valve arrangement disposed in said bore between said inlet chamber and said outlet chamber including a valve to close a first connection between said inlet chamber and said outlet chamber when a predetermined switching pressure determined by a control force applied to said valve is achieved and a check valve to open a second connection between said inlet chamber and said outlet chamber upon a pressure reduction in said inlet chamber relative to pressure in said outlet chamber;
said valve including
a tappet disposed coaxial of said axis biased by said control force toward said outlet chamber to establish said switching pressure,
a substantially cylindrical elastic body disposed coaxial of said axis in an operative association with and surrounding said tappet, the outer surface of said valve body being spaced from the inner surface of said bore, the outer surface of said tappet and the inner surface of said valve body cooperating to provide at least a portion of said second connection, and
means surrounding said valve body to reinforce the outer surface thereof to prevent deformation of said valve body toward the inner surface of said bore, said means being a cylinder enclosing said valve body, said cylinder being part of a cup-shaped cap having an open end directed toward said inlet chamber and a bottom in said operative association with said tappet, said second connection including at least one pressure medium channel provided between said valve body and said tappet, said channel communicating with said outlet chamber via a pressure medium opening disposed in said bottom of said cap and being sealable relative to said inlet chamber by a sealing lip, said sealing lip being an extension of said valve body extending toward said inlet chamber and surrounding said tappet.

8. A pressure control unit comprising:
a housing having a bore therein coaxial of a longitudinal axis;
an inlet chamber disposed in said bore;
an outlet chamber spaced from said inlet chamber disposed in said bore; and
a valve arrangement disposed in said bore between said inlet chamber and said outlet chamber including a valve to close a first connection between said inlet chamber and said outlet chamber when a predetermined switching pressure determined by a control force applied to said valve is achieved and a check valve to open a second connection between said inlet chamber and said outlet chamber upon a pressure reduction in said inlet chamber relative to pressure in said outlet chamber;
said valve including
a tappet disposed coaxial of said axis biased by said control force toward said outlet chamber to establish said switching pressure,
a substantially cylindrical elastic body disposed coaxial of said axis in an operative association with and surrounding said tappet, the outer surface of said valve body being spaced from the inner surface of said bore, the outer surface of said tappet and the inner surface of said valve body cooperating to provide at least a portion of said second connection, and
means surrounding said valve body to reinforce the outer surface thereof to prevent deformation of said valve body toward the inner surface of said bore,
said means being a cylinder enclosing said valve body, said cylinder being part of a cup-shaped cap having an open end directed toward said inlet chamber and a bottom in said operative association with said tappet,
said open end of said cap engaging an annular groove of a sleeve fixed in said bore adjacent said inlet chamber coaxial of said axis, said groove being parallel to said axis.

9. A unit according to claim 8, wherein
said first connection includes radial pressure medium openings provided in the wall of said open end of said cap between said sleeve and said valve body.

10. A unit according to claim 8, wherein
a stop is provided in said bore adjacent said outlet chamber against which said bottom of said cap is biased when said valve is open.

11. A unit according to claim 8, wherein said second connection includes at least one pressure medium channel provided between said valve body and said tappet, said channel communicating with said outlet chamber via a pressure medium opening disposed in the bottom of said cap and being sealable relative to said inlet chamber by a sealing lip.

12. A unit according to claim 11, wherein said sealing lip is an extension of said valve body extending toward said inlet chamber and surrounding said tappet.

13. A unit according to claim 8, wherein said open end of said cap engages said groove with radial clearance between the walls of said groove and the open end of said cap.

14. A unit according to claim 13, wherein said first connection includes radial pressure medium openings provided in the wall of said open end of said cap between said sleeve and said valve body.

15. A unit according to claim 13, wherein a stop is provided in said bore adjacent said outlet chamber against which said bottom of said cap is biased when said valve is open.

16. A unit according to claim 13, wherein said second connection includes at least one pressure medium channel provided between said valve body and said tappet, said channel communicating with said outlet chamber via a pressure medium opening disposed in said bottom of said cap and being sealable relative to said inlet chamber by a sealing lip.

17. A unit according to claim 16, wherein said sealing lip is an extension of said valve body extending toward said inlet chamber and surrounding said tappet.

* * * * *